United States Patent [19]
Masuda et al.

[11] Patent Number: 4,800,932
[45] Date of Patent: Jan. 31, 1989

[54] METHOD AND APPARATUS FOR JUDGING INNER PRESSURE OF FILLED CAN

[75] Inventors: Masayuki Masuda; Tamotsu Umeyama, both of Sagamihara, Japan

[73] Assignee: Daiwa Can Company, Ltd., Tokyo, Japan

[21] Appl. No.: 1,892

[22] Filed: Jan. 9, 1987

[30] Foreign Application Priority Data

Jan. 13, 1986 [JP] Japan .................................. 61-4650

[51] Int. Cl.$^4$ .............................................. B07C 5/34
[52] U.S. Cl. ................................... 141/83; 209/599
[58] Field of Search .................. 141/1, 83, 94, 95, 96, 141/198; 209/599, 604; 33/558

[56] References Cited

U.S. PATENT DOCUMENTS

| | | | |
|---|---|---|---|
| 3,303,571 | 2/1967 | Veals | 33/558 |
| 3,932,977 | 1/1976 | Ringler | 141/95 |
| 4,494,583 | 1/1985 | Reeves et al. | 141/83 |

FOREIGN PATENT DOCUMENTS 59157537 9/1959 Japan.

*Primary Examiner*—Mark J. Thronson
*Attorney, Agent, or Firm*—Wenderoth, Lind & Ponack

[57] ABSTRACT

An apparatus for determining the internal pressure of a filled can by measuring the reaction force of a filled can body when the can is passed between back-up and measuring rolls which are spaced apart from each other by 2 mm or more than the average diameter of the axially central portion of the can body. At least one of the rolls has a crown-like outer periphery which has an arcuate sectional profile having a radius of 60 mm or above taken in a plane containing the roll axis.

1 Claim, 4 Drawing Sheets

METHOD AND APPARATUS FOR JUDGING INNER PRESSURE OF FILLED CAN

BACKGROUND OF THE INVENTION

1. Field of the Invention

This invention relates to a device for measuring the inner or internal pressure of filled cans and, more particularly, to an apparatus for determining whether the filled can inner pressure is satisfactory by measuring the reaction force provided by the filled can when the can barrel is pressed in a direction coincident with the diameter thereof.

2. Description of the Related Art

A prior art apparatus for determining the filled can inner pressure by measuring the reaction force provided by the can barrel (can body) comprises a back-up unit and a measuring unit. The distance between a back-up roll of the back-up unit and a measuring roll of the measuring unit is set at a value which is very slightly smaller than the average value of the barrel of filled cans to be measured. The reaction force imparted to the measuring roll engaging a filled can when the can barrel passes through this gap is measured by a load cell to determine whether the inner pressure is satisfactory. The sectional profile of the can barrel, however, is not really circular, but there is an error of about 0.7 mm at the most between the maximum and minimum diameters. Therefore, with the afore-mentioned distance between the back-up and measuring rolls, some cans may pass through the gap between the two rolls without almost being sandwiched by these rolls. Thus, it is impossible to effect an appropriate determination as to whether or not the can inner pressure is satisfactory.

An apparatus having an aim of solving the above problem is disclosed in Japanese Patent Laid-Open Publication No. 157537/84. The disclosed apparatus comprises, as shown in FIG. 5, a back-up unit A, having a cylindrical and rotatable back-up roll 1, a measuring unit B having a measuring roll 3 having a crown-like outer periphery 2 and rotatably supported by a support rod 4 which is mounted in a bearing 5 such that the load applied to said roll 3 is transmitted to a load cell 6 through the rod 4, said load cell 6 contacting one end of the rod 4 and measuring the amount of the load transmitted to said rod 4 via said roll 3; and a conveyor unit having rope belts 7a to 7d, the belts 7a and 7b being adapted to contact both sides of an upper portion of the barrel of a filled can C1, and the belts 7c and 7d in contact with a lower portion of the can barrel, to guide the can C such that the can barrel C1 proceeds through the gap between the rolls 1 and 3. Reference numeral 8 is a filled can support member for supporting the bottom of proceeding filled cans.

In the apparatus disclosed in FIG. 5, the can body is guided in a state sandwiched between the four rope belts to proceed without rotating, and two sets of a back-up unit and a measuring unit are provided to hold said can between them. Each measuring roll thrusts the same portion of the body of a proceeding filled can with a different amount of thrust other. Then each reaction force of the can barrel is measured by each load cell. Finally, whether the internal pressure is satisfactory is determined by comparing the difference between the two measured values with a standard value.

The apparatus for determining the filled can inner pressure disclosed in the publication described above, however, has two sets of back-up and measuring units for low inner pressure filled cans and a unit for measuring the extent of deformation of the end or lid of high inner pressure filled cans. Therefore, the apparatus is complicated and expensive. Furthermore, the measurement is done twice with respect to the same portion of the body of the filled can, and the two measurement values are processed. Furthermore, separate methods of measurement have to be used for low inner pressure filled cans and high inner pressure filled cans. Thus, the determination becomes complicated.

SUMMARY OF THE INVENTION

This invention solves the above-described problems. According to the invention, there is are apparatus for determining the inner pressure in a filled can, said apparatus comprising a back-up unit including a rotatably mounted back-up roll made of a hard material, a measuring unit including a measuring roll rotatably mounted about an axis of rotation extending parallel to the axis of rotation of the back-up roll and made of a hard material, a load cell for measuring the load applied to said measuring roll, andonveyor for advancing a filled can such that the barrel of the can passes between said two rolls. One of said back-up and measuring rolls has a crown-shaped outer periphery, and the other has a cylindrical outer periphery. The outer periphery of one of said back-up and measuring rolls has an arcuate sectional profile with a radius of 60 mm or more taken in a plane containing the roll axis. The two rolls are spaced apart by a distance smaller than the average diameter of the axially central portion of said can barrel by 2 mm or more, and only one set of the back-up and measuring units is installed. Whether or not the inner pressure in the filled can is satisfactory is determined by measuring the reaction force provided by the can barrel when the can barrel passes through between the two spaced apart rolls Furthermore, there is also a slide block connecting integrally to the back-up unit and the measuring unit and mounted via a resilient member on a base such that the slide block can move back and forth in directions perpendicular to the direction of movement of the filled can. The conveyor includes flat belts in forced contact with opposite ends of the filled can.

DETAILED DESCRIPTION OF THE PREFERRED EMBODIMENTS

In an apparatus for determining the filled can inner pressure according to the invention, the distance between the back-up and measuring rolls is smaller than the average diameter of the central portion of the can barrel by 2 mm or more. Thus, the ratio of the reaction force extended by the can barrel to the can inner pressure is constant when the can barrel passes through the gap between the two rolls. It is thus possible to judge whether the inner pressure of the filled can is satisfactory.

Figure 2:
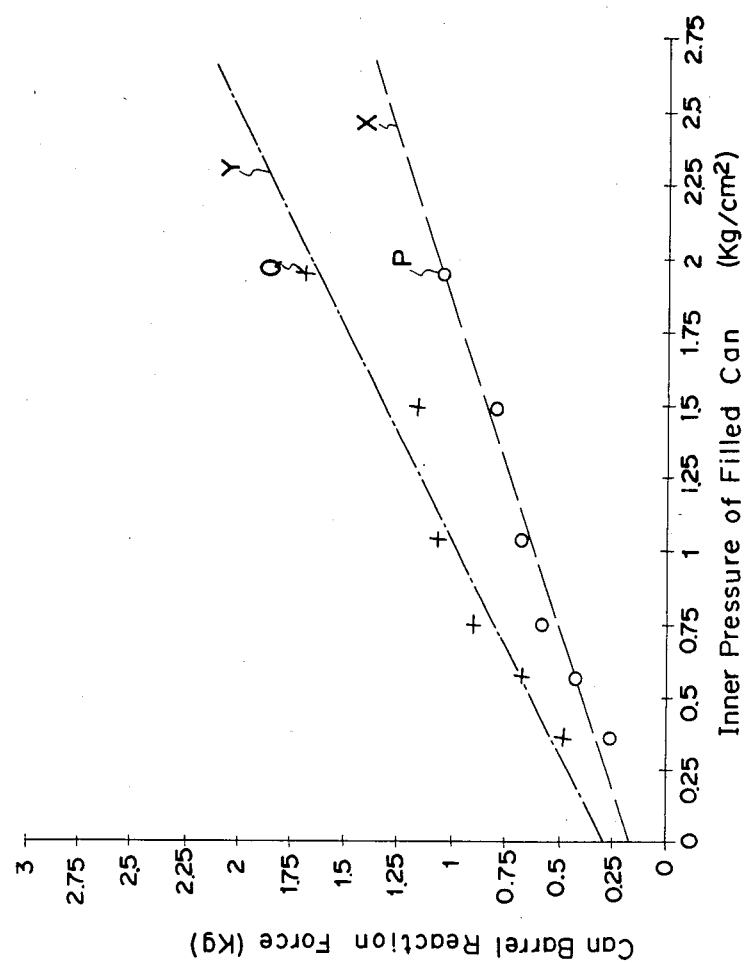
FIG. 2 is a graph showing the relation between the can barrel reaction force and can inner pressure when the distance between two rolls is smaller than the average can barrel diameter by 1 mm and the radii of the arcuate sectional profile of a roll is 50 and 136 mm.
Figure 3:
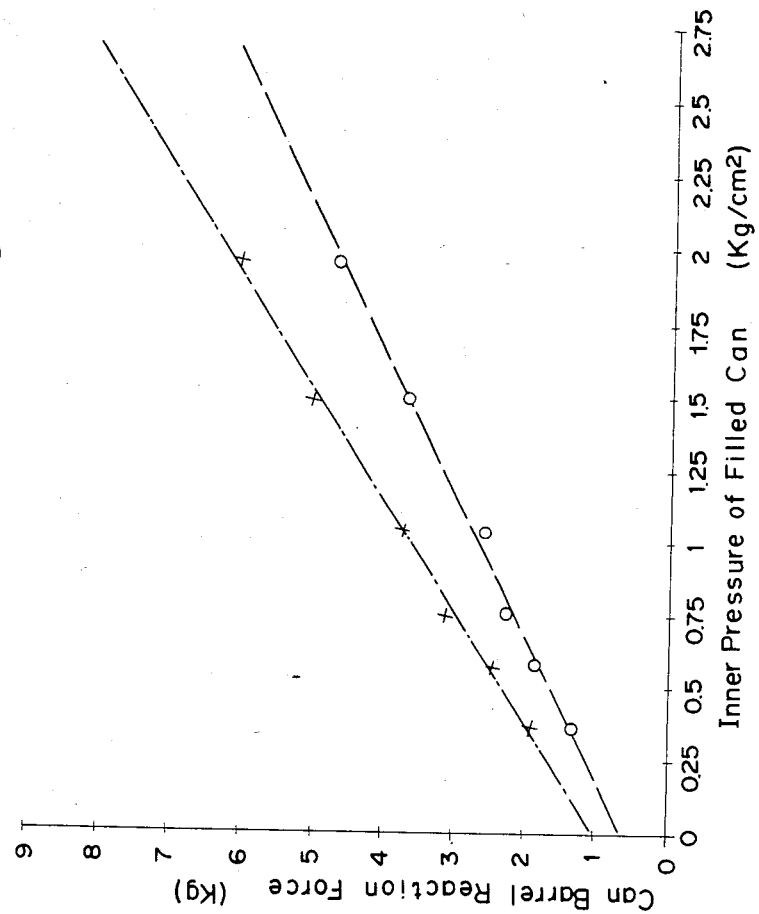
FIG. 3 is a graph showing the relation between the can barrel reaction force and can inner pressure when the distance between the rolls is smaller than the average can barrel diameter by 2 mm and the radii of the arcuate sectional profile of a roll is 50 and 136 mm.
Figure 4:
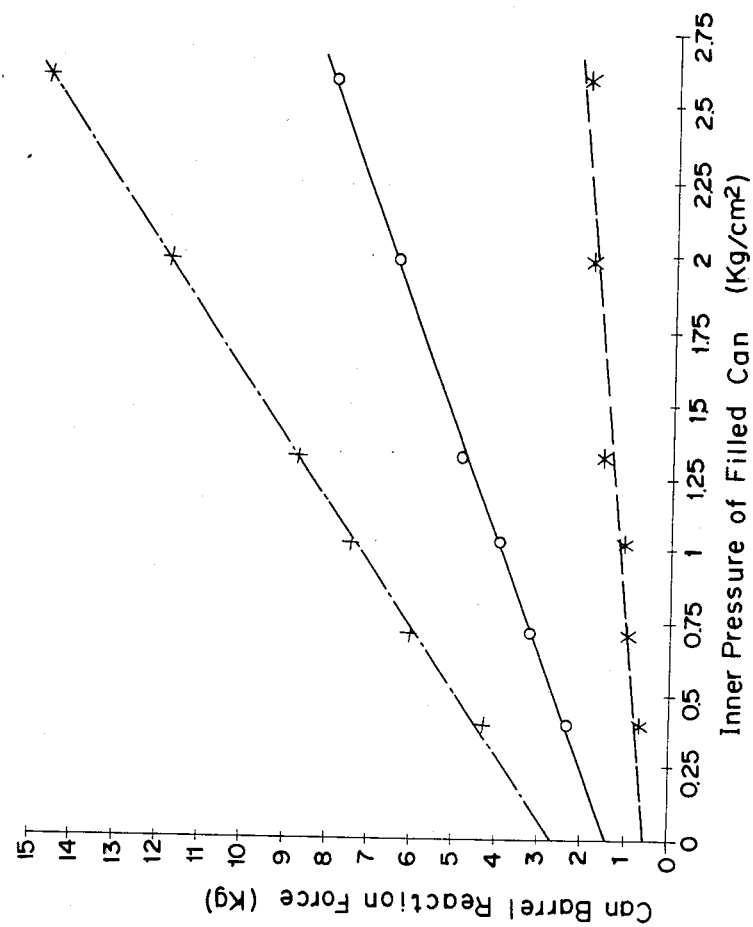
FIG. 4 is a graph showing the relation between the can barrel reaction force and can inner pressure when a roll with an arcuate sectional profile having a radius of 136 mm is used and the distance between the rolls is smaller than the average can barrel diameter by 1, 2 and 3 mm, respectively.

The above can be known from the followings derived from FIGS. 2, 3, and 4.

FIG. 2 shows the relation between the reaction force exerted by the can barrel and the can inner pressure when the distance between two rolls is smaller than the average can barrel diameter by 1 mm and a filled can with a diameter of approximately 66 mm and a height of 122 mm is passed between the two rolls. Shown at P (i.e., circles ○) are values when a roll with a crown-like outer periphery having an arcuate sectional profile with a radius of 50 mm is used. Shown at Q (i.e., crosses X) are values when a roll with an arcuate profile with a radius of 136 mm is used. Many of these values are deviated from the dashed plot X and dot-and-bar plot Y. This shows that, with the distance between the rollers noted above, the ratio of the can inner pressure to the can barrel reaction force is not constant. But, when the distance between the rolls is smaller than the average can barrel diameter by 2 mm, as shown in FIG. 3, the ratio of the can inner pressure to the can barrel reaction force is substantially constant as indicated by the values marked by the circles (○) and the values marked by the crosses (X).

FIG. 4 shows the relation between the can barrel reaction force and the can inner pressure when a roll with a crown-like outer periphery having an arcuate profile with a radius of 136 mm, when the distance between the rolls is smaller than the average can barrel diameter by 1 mm (cross marks *), smaller by 2 mm (circular marks ○) and smaller by 3 mm (crosses X). When the distance between the rolls is smaller by 1 mm as shown by cross marks (*), the difference in the can barrel reaction force is small compared with the difference in the can inner pressure. Thus, it becomes more difficult to determine the inner pressure.

In the apparatus for determining the inner pressure in a filled can according to the invention, the can body is pressed by a roll having a crown-like outer periphery with an arcuate section profile having a radius of 60 mm or more located in a plane containing the roll axis. Thus, no damage in the circumferential direction is caused when the can barrel is pressed.

This is evident from Table 1 "Roll shape, extent of thrusting and damage". The table shows the result of damage to the can barrel when the inner pressure of a filled can with a diameter of about 66 mm and a height of about 122 mm is measured using rolls having a length of 40 mm and having arcuate crown-like sectional profiles with radii of 50, 60 and 136 mm extending in a plane containing the roll axes.

TABLE 1

Roll shape, extent of thrusting and damage

| Radius of arcuate sectional profile of roll (mm) | Extent of thrusting (mm) | Can inner pressure (Kg/cm²) | | | | | |
|---|---|---|---|---|---|---|---|
| | | 0.36 | 0.57 | 0.75 | 1.04 | 1.49 | 1.95 |
| 50 | 1 | ⊚ | ⊚ | ⊚ | ⊚ | ⊚ | ⊚ |
| | 2 | ⊚ | ○ | ○ | ○ | X | ✗ |
| | 3 | ✗ | ✗ | ✗ | ✗ | ✗ | ✗ |
| 60 | 2 | ⊚ | ⊚ | ⊚ | ⊚ | ⊚ | ⊚ |
| 136 | 1 | ⊚ | ⊚ | ⊚ | ⊚ | ⊚ | ⊚ |
| | 2 | ⊚ | ⊚ | ⊚ | ⊚ | ⊚ | ⊚ |
| | 3 | ○ | ○ | ○ | ○ | ○ | ○ |

⊚ ... No damage  } Passed
○ ... Very slight damage

X ... Light damage  } Rejected
✗ ... Damage

When a roll having an arcuate sectional profile with a radius of 50 mm was used, some can barrels were damaged very slightly so that they could not be judged to be satisfactory when the distance between the two rolls was smaller then the average can diameter by 2 mm, which is one of the conditions according to the invention. On the other hand, when a roll having an arcuate sectional profile with a radius of 60 mm was used, no damaged can barrel was produced when the distance between the two rollers was smaller than the average can diameter by 2 mm. When a roll havng an arcuate sectional profile with a radius of 136 mm was used, very slight damage was caused so that the product is satisfactory even when the distance between the two rollers was smaller than the average can diameter by 3 mm. The arcuate section of the roller and the end of the roller each have a radius of 1 mm.

As has been described above, according to the present invention, the can inner pressure, in both cans in which the internal pressure is low and in cans in which the internal pressure is high, may be easily determined by merely multiplying the can barrel reaction force by a constant. Furthermore, since the constant is high, it is possible to obtain reliable values.

Now, the invention will be described in conjunction with an embodiment thereof shown in FIG. 1.

Figure 1:
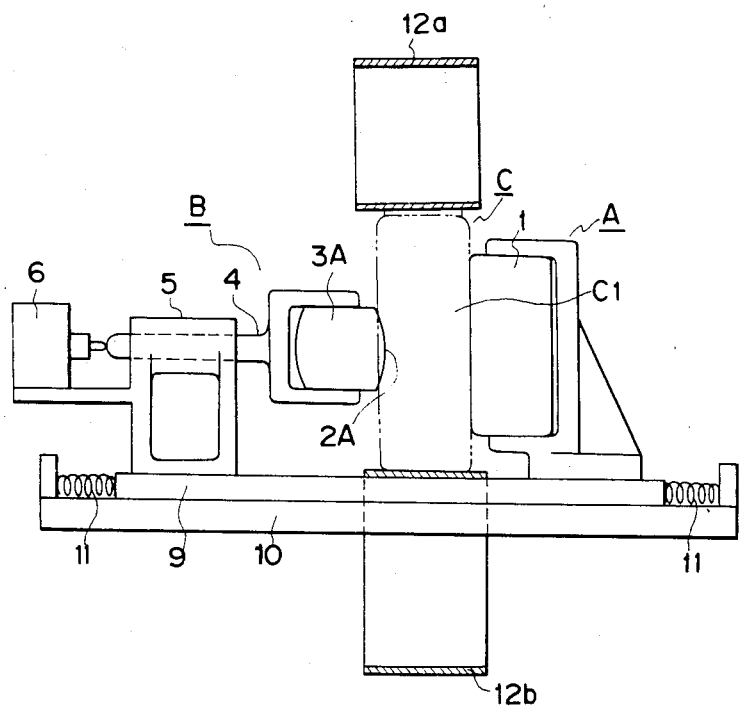
FIG. 1 is a schematic front view showing an apparatus for determining the inner pressure of a filled can according to the invention.
Figure 5:
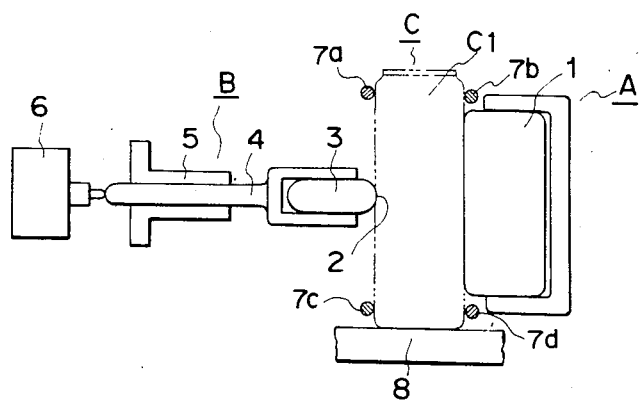
FIG. 5 is a schematic front view showing a prior art filled can inner pressure determination apparatus.

FIG. 1 is a schematic front view showing an apparatus for determining the filled can inner pressure according to the invention. Referring to the Figure, parts A, B, C, 1, 4, 5, and 6 designate the same parts as shown by A, B, C, 1, 4, 5, and 6 shown in FIG. 5. Numeral 3A designates a measuring roll consisting of a hard material, 2A the outer periphery of the measuring roll having an arcuate sectional profile and a radius of 60 mm or more, 9 a plate-like slide block to which the back-up and measuring units A and B are integrally connected, 10 a base supporting the slide block 9 such that the block can move back and forth via springs 11 in a direction extending at right angles to the direction of movement of the can, and 12a and 12b flat belts of a conveyor adapted to be in forced contact with the opposite ends of the filled can in the axial direction thereof.

In this example, the back-up roll 1 is also made of a hard material, and the distance between the back-up and measuring rolls 1 and 3A is smaller than the average diameter of the center of the barrel of filled cans by 2 mm. the measuring roll 3A has an arcuate, i.e., crown-like outer periphery 2A with a radius of 136 mm and a length of 40 mm. Cans to be measured (with a diameter of about 66 mm and a height of approximately 122 mm) are supplied substantially successively between the upper and lower flat belts 12a and 12b. Each filled can is guided by the flat belts 12a and 12b toward the gap between the back-up and measuring rolls 1 and 3A. Almost all of the filled cans first contact one of the rolls 1 and 3A. As a result, the back-up and measuring units A and B and slide block 9, these parts being integral with one another, are displaced against the spring forces of the spring 11. The filled can is thus fed between and in contact with the two rolls. The reaction force was measured and recorded by the load cell 6.

When the reaction force measured in the above-described manner is less than 2.5 kg, the filled can is rejected. The inner pressures of filled cans which showed reaction forces of 2.5 to 3.0 kg were actually measured. Among the cans, there was no filled can the internal pressure of which was less than 0.5 kg/cm$^2$, thus showing that the determination of the inner pressure valves were performed accurately by the apparatus of the present invention.

When determining the filled can inner pressure with the apparatus according to the invention, the distance between the back-up and measuring rollers is smaller than the average filled can barrel diameter by 2 mm or more, and the outer periphery of either the back-up or the measuring roll has an arcuate sectional profile with a radius of 60 mm or more taken in a plane containing the roll axis. Therefore, it is possible to display the reaction force of the can barrel without damaging the can barrel even if there are fluctuations of about 0.7 mm in the barrel diameter. And, since the displayed reaction force is linearly proportional to the filled can inner pressure, it is possible to determine the filled can inner pressure by merely passing the filled can between a back-up roll and a measuring roll no matter if the inner pressure is high or low. Thus the determination can be simply performed.

Since the filled can inner pressure determination apparatus according to the invention comprises only a single set of back-up and measuring units, the construction is simple.

We claim:
1. An apparatus for determining whether or not the inner pressure of a filled can moving in a conveyed direction is satisfactory, said apparatus comprising:
   a back-up unit and a measuring unit between which the filled can moves in the conveyed direction,
   said back-up unit including a hard back-up roll rotatably mounted in the apparatus about a fixed axis of rotation for rotatably engaging the barrel of the filled can moving between said back-up unit and said measuring unit,
   said measuring unit including a measuring roll spaced from said back-up roll and rotatably mounted in the apparatus about an axis of rotation thereof that extends parallel to the fixed axis of rotation of said measuring roll, and a support rod means to which said measuring roll is rotatably mounted for receiving a reaction force exerted by the can on said measuring roll when the outer diameter of the barrel of the can moved between said back-up unit and said measuring unit is greater than the distance at which said measuring roll is spaced from said back-up roll,
   one of said back-up roll and said measuring roll having an outer periphery having an arcuate sectional profile that extends in a plane in which the axis of rotation of said one of said back-up roll and said measuring roll is disposed,
   a load cell operatively connected to said support rod means for sensing said reaction force received by the support rod means to determine whether or not the inner pressure of the filled can moving in the conveyed direction is satisfactory, and
   a slide block to which said back-up roll, said load cell and said measuring roll are mounted, a base on which said slide block is slidably supported, and resilient spring means connected between said slide block and said base for biasing said slide block to a predetermined position on said base and for allowing said slide block to slide on said base from said position.

* * * * *